UNITED STATES PATENT OFFICE.

OSCAR RUSSELL, OF CHICAGO, ILLINOIS, ASSIGNOR OF TWO-THIRDS TO WILLIAM G. WISE AND PERCY M. EDWARDS, OF CHICAGO, ILLINOIS.

COMPOSITION OF MATTER.

SPECIFICATION forming part of Letters Patent No. 714,039, dated November 18, 1902.

Application filed May 26, 1902. Serial No. 109,078. (No specimens.)

*To all whom it may concern:*

Be it known that I, OSCAR RUSSELL, a citizen of the United States, residing at Chicago, in the county of Cook and State of Illinois, have invented a new and useful Composition of Matter to be Used for Fireproofing Purposes, and particularly designed and adapted for fireproofing yarn, cord, and the like made from combustible vegetable fiber.

A primary object of the invention is to provide a composition of matter adapted for fireproofing cotton yarn used for covering insulated copper wire to be used as an electrical conductor to prevent the setting of fires from the crossing of electrical wires, which with the coverings now in common use is the source of frequent fires.

My composition consists of the following ingredients, combined in the following proportions, to wit: silicate of soda, by weight, twelve pounds; ivory-black, by weight, one pound. These ingredients are treated and mixed in the following manner: The silicate of soda is dissolved in water, enough water being used so that the solution will be of about the thickness and consistency of thin mucilage. Before the solution of silicate of soda and ivory-black are mixed the ivory-black is first thoroughly mixed with water until it forms a thick paste. The solution of silicate of soda and the ivory-black paste are then mixed by slowly pouring the silicate of soda upon the ivory-black paste, while at the same time stirring the ivory-black paste vigorously, the resulting product being a black liquid of about the consistency of ordinary paint.

In practice I have used a low grade of ivory-black known commercially as "Swedish" black.

The proportions of the ingredients of my improved composition of matter may be varied within limits; but I have derived the best results from and prefer to use the proportions stated above.

In fireproofing cotton yarn and the like by means of my improved composition of matter the yarn is saturated with the solution either by immersing it in the solution or otherwise applying the solution thereto. For the purpose of fireproofing wood and the like my improved composition of matter may be applied thereto by means of a brush in the same manner as ordinary paint.

I claim—

1. The herein-described composition of matter consisting of silicate of soda and ivory-black, substantially as described.

2. The herein-described composition of matter for fireproofing purposes, consisting of silicate of soda, twelve (12) pounds and ivory-black one (1) pound, combined in the manner described, substantially as described.

In testimony that I claim the foregoing as my invention I affix my signature, in presence of two subscribing witnesses, this 22d day of May, A. D. 1902.

OSCAR RUSSELL.

Witnesses:
 HENRY JOHNSON,
 DENA LINDSAY.